United States Patent
Mielke

(10) Patent No.: US 8,375,542 B2
(45) Date of Patent: Feb. 19, 2013

(54) METHOD FOR THE MANUFACTURE OF METALLIC COMPONENTS

(75) Inventor: Rainer Mielke, Oberursel (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 768 days.

(21) Appl. No.: 12/509,929

(22) Filed: Jul. 27, 2009

(65) Prior Publication Data

US 2010/0024214 A1 Feb. 4, 2010

(30) Foreign Application Priority Data

Jul. 31, 2008 (DE) .......................... 10 2008 035 585

(51) Int. Cl.
*C21D 7/06* (2006.01)
*B23P 6/00* (2006.01)
*B23Q 17/20* (2006.01)

(52) U.S. Cl. ..................... 29/90.7; 29/889.1; 29/407.01; 72/53

(58) Field of Classification Search ................ 29/90.01, 29/90.7, 889, 889.1, 889.2, 889.21, 889.22, 29/889.3–889.722, 402.01, 407.01, 407.04–407.09; 72/53
See application file for complete search history.

(56) References Cited

U.S. PATENT DOCUMENTS

| | | | | |
|---|---|---|---|---|
| 4,687,556 A | * | 8/1987 | Sutton et al. | 205/151 |
| 5,525,429 A | * | 6/1996 | Mannava et al. | 428/610 |
| 5,816,088 A | * | 10/1998 | Yamada et al. | 72/53 |
| 6,790,294 B1 | * | 9/2004 | Ishida et al. | 148/212 |
| 7,871,671 B2 | * | 1/2011 | Oguri et al. | 427/299 |

FOREIGN PATENT DOCUMENTS

| | | |
|---|---|---|
| DE | 1558022 | 2/1970 |
| DE | 4311507 | 1/1994 |
| DE | 19500078 | 7/1996 |
| DE | 19815572 | 10/1999 |
| DE | 202004021411 | 2/2008 |

OTHER PUBLICATIONS

German Search Report dated Mar. 5, 2009 from counterpart German patent application.
Schrader, H., Buhler, K.: Druck macht Spannung. In: Maschinenmarkt, Wurzburg 93, 1987, 52/53 s. u.a. S. 27, mittlere Sp.2, Abs., S. 28—Abschn., "Kugelstrahlumformen verbessert Randschicht:" und "Trennverfahren beeinflussen den Werkstoff".

* cited by examiner

*Primary Examiner* — Sarang Afzali
(74) *Attorney, Agent, or Firm* — Timothy J. Klima; Shuttleworth & Ingersoll, PLC

(57) ABSTRACT

When manufacturing slender metallic components (9) by cutting shaping from pre-manufactured forgings (1), the respective component (9) upon finish machining by cutting is dimensionally inspected to determine deformations (a) induced by manufacture, as compared to the nominal position, and on the basis of the measuring result the position of tensile stress areas (4) in rim layers of the component (9) is determined. For positionally balancing the component (9), the tensile stress areas (4) causing deformation of the component (9) are subjected to controlled shot peening at a specified intensity.

5 Claims, 1 Drawing Sheet

METHOD FOR THE MANUFACTURE OF METALLIC COMPONENTS

Figure 1:
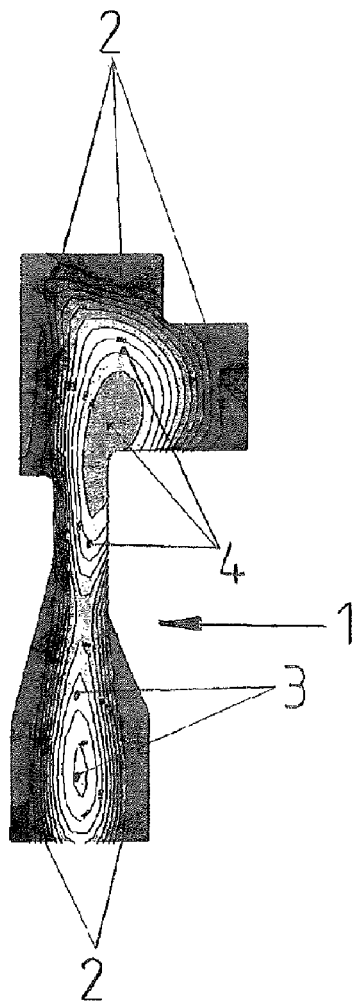

This application claims priority to German Patent Application No. 10 2008 035 585.2, filed Jul. 31, 2008, which application is incorporated by reference herein.

This invention relates to a method for the manufacture of slender metallic components finish-machined by cutting shaping from pre-manufactured forgings.

A great variety of mechanically highly stressed metallic components is initially pre-manufactured as forging blanks, subsequently heat-treated and finally finish-machined by a cutting shaping process, for example milling. In order to ensure high roadability and a long service life of the component in spite of minimum weight and correspondingly small size, the finished component is in such a manner arranged in the forging blank having tensile and compressive-stress areas, or machined therefrom in a cutting shaping process, that the tensile-stress component in the finished item is minimum and evenly distributed in the inner cross-sectional area thereof. In particular with asymmetrically shaped components, such as gas-turbine engine compressor and turbine disks provided with a flange arm, uneven distribution of the tensile and compressive-stress components is mostly unavoidable. Due to the uneven distribution of the internal stresses and the position of tensile stresses in the rim area of such components, the finish machining process by cutting, on account of both-side machining forces and tensile-stress components, is likely to cause contour deviations—in particular where such components, owing to improved material properties, are weight-savingly provided with thin cross-sections, for example turbine and compressor disks with thin web—which at best are avoidable or reducible by expensive countermeasures during cutting machining, or will result in the production of scrap. Equalization of the internal stresses by previous heat treatment of the forging can, on the other hand, affect the service life of the finish-machined item.

In a broad aspect the present invention provides a method for the manufacture of components finish-machined by cutting shaping from pre-manufactured forgings, in particular of compressor or turbine disks with thin-walled web, by which contour deviations on the finished item are reduced or avoided, while keeping manufacturing and cost expenditure low.

The present invention, in its basic concept, provides that the component, upon finish machining, is dimensionally inspected for accuracy of shape and the position and formation of tensile stress areas in rim sections of the component are determined from the location, nature and amount of the measured deviation from the nominal position. Only these external tensile-stress areas, which are located on the concave surfaces of the component, will be subjected to controlled shot peening at a specific peening intensity, so that residual compressive stresses are induced in these confined zones and the item is returned into positional balance. This enables precisely aligned components, for example engine compressor or turbine disks with thin web, to be manufactured with relatively little effort which, otherwise, would require substantially higher investment or would not at all be producible to the required accuracy.

Controlled shot peening of the tensile stress areas determined in the rim layers is accomplished with a specified peening intensity controlled by the shot und the peening speed. Upon shot peening, the component is again dimensionally inspected and, if deformation persists, re-treated with higher peening intensity in the locally confined rim layers. This operation can be repeated as appropriate.

The present invention is more fully described in light of the accompanying drawings showing a preferred embodiment. In the drawings, FIG. 1 schematically shows a forging intended for finish machining by cutting, and FIG. 2 schematically shows a turbine disk asymmetrically provided with a flange arm after cutting machining.

Figure 2:
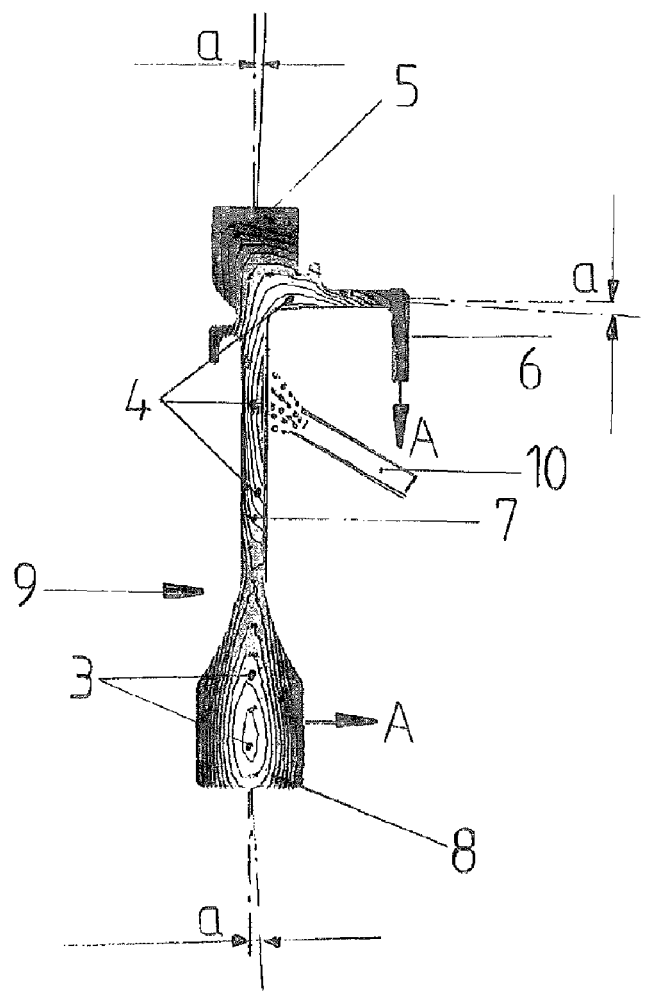

Referring to FIG. 1, the schematically shown forging 1 (forging blank), which is intended for subsequent cutting machining to a turbine disk for a gas-turbine engine, has, in certain parts, tensile stress areas 3 and 4, besides the compressive stress areas 2. These tensile stresses are unevenly distributed over the cross-sectional area of the forging 1 and not only confined to the internal areas of the blank so that, as shown in FIG. 2, the finish-machining process by cutting creates tensile stress areas 4 in individual rim sections in the compressor disk 9 (metallic component shaped by cutting machining) including a blade fixing portion 5, a flange arm 6, a web 7 and a hub 8. This means that the finished turbine disk 9 cannot be arranged in the forging 1, or machined therefrom, in such a manner that all tensile stress areas are included in the compressive stress areas. Due to this unfavorable tensile stress distribution and the forces acting upon the workpiece during cutting machining, the turbine disk 9 will bend or distort during finish machining by cutting in the direction of arrowhead A, depending on the cutting forces, the arrangement and size of the tensile stress areas and the dimensioning of the turbine disk 9, in particular in the area of the slender web 7. In FIG. 2, the exemplary deformation of the finish-machined turbine disk 9 relative to the nominal position is each identified by the value "a".

Upon cutting machining, the turbine disk 9 is dimensionally inspected using known measuring methods to determine the type, location and amount of the deformation "a" occurring in particular on turbine or compressor disks with weight-saving thin web 7. On the basis of the measuring result and the resultant position of the tensile stress areas 4, which here are situated on the concave front of the web 7 and at the transition to the flange arm 6, the turbine disk 9 is subsequently subjected, at a specified peening intensity, to a shot peening treatment which is locally confined, i.e. limited to the tensile stress areas 4 lying on the rim (and not in the interior) of the turbine disk 9, using a shot peening equipment 10. By controlled shot peening, a residual compressive stress is impressed only to the shot-impinged tensile stress area 4 for the purpose of reversing the contour deviations "a" of the turbine disk 9. Subsequently, the turbine disk 9 is dimensionally re-inspected. If the contour deviation or deformation "a" of the turbine disk 9 persists, the shot peening treatment is repeated with increased peening intensity. Thus, relatively slender and lightweight compressor or turbine disks or similar components are producible without contour deviations and with low expenditure.

LIST OF REFERENCE NUMERALS

1 Forging, forging blank
2 Compressive stress areas
3 Internal tensile stress area
4 External tensile stress area
5 Blade fixing portion
6 Flange arm
7 Web
8 Hub
9 Compressor disk, component machined by cutting shaping
10 Shot peening equipment "a" Contour deviation, deformation as compared to nominal position
A Direction of deformation

What is claimed is:

1. A method for manufacturing a slender metallic component, comprising:
    finish machining a pre-manufactured forging;
    dimensionally inspecting the finish machined forging to determine a bending contour deformation induced by the finish machining;
    determining a position of a tensile stress area in a rim layer of the finish machined forging based on the dimensional inspection; and
    subjecting the tensile stress area causing the bending contour deformation of the finish machined forging to controlled shot peening at a specified intensity to impart a residual compressive stress on the tensile stress area to reverse the bending contour deformation.

2. The method of claim 1, and further comprising: after controlled shot peening of the finish machined forging, dimensionally reinspecting the finish machined forging and, if any bending contour deformation persists, again subjecting the finish machined forging to controlled shot peening in the tensile stress area at an increased peening intensity to reverse the bending contour deformation.

3. The method of claim 2, wherein the component is at least one of a turbine disk and a compressor disk of a gas-turbine engine.

4. The method of claim 3, and further comprising repeating the controlled shot peening of any tensile stress area of the rim layer of the finish machined forging to reverse any bending contour deformation of the finish machined forging to positionally balance the finish machined forging.

5. The method of claim 1, wherein the component is at least one of a turbine disk and a compressor disk of a gas-turbine engine.

* * * * *